April 3, 1928. 1,664,531
H. E. THOMPSON
WHEEL FOR AUTOMOBILES
Filed June 10, 1926
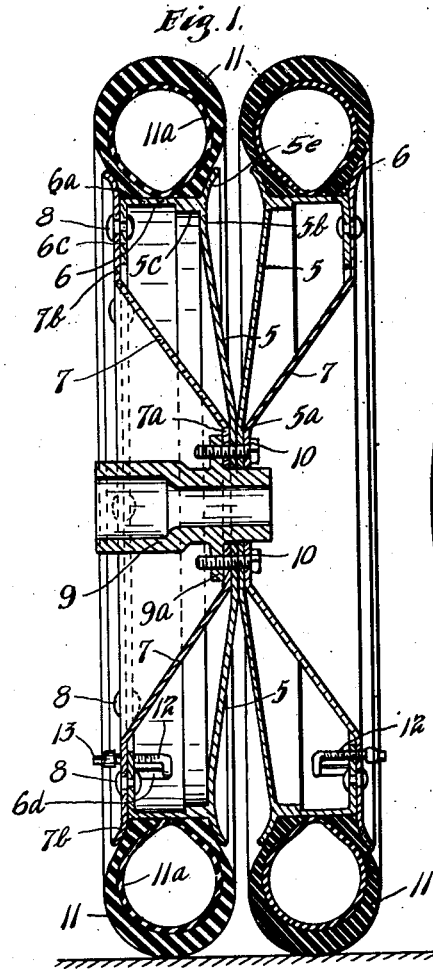
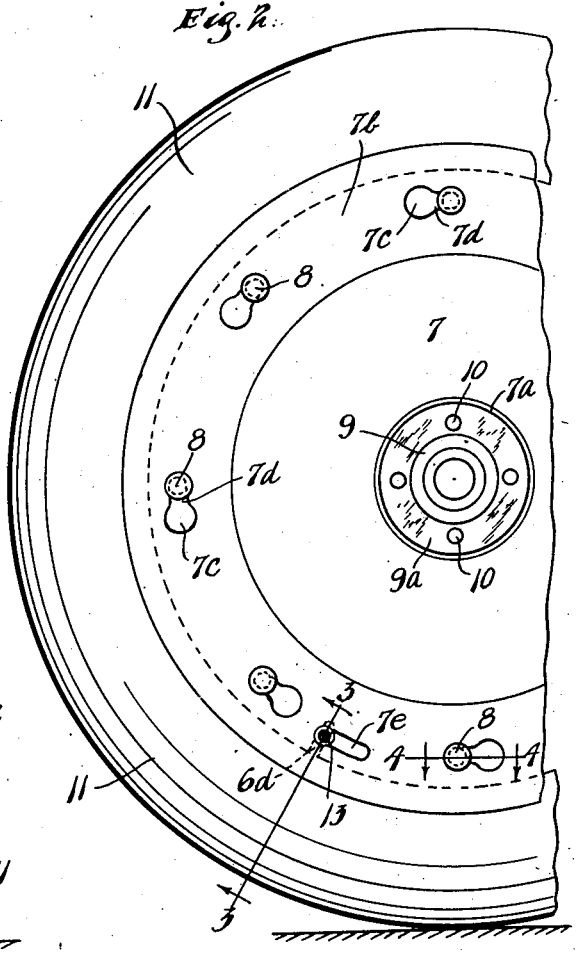
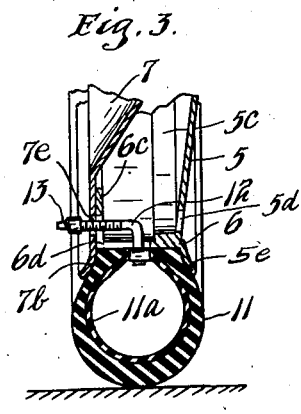
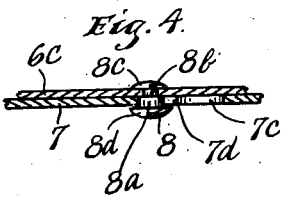
INVENTOR.
HALBERT E. THOMPSON.
BY HIS ATTORNEYS.

Patented Apr. 3, 1928.

1,664,531

UNITED STATES PATENT OFFICE.

HALBERT E. THOMPSON, OF MINNEAPOLIS, MINNESOTA.

WHEEL FOR AUTOMOBILES.

Application filed June 10, 1926. Serial No. 114,976.

This invention relates to a wheel, and while the same is applicable to various types of wheels, it particularly relates to a wheel such as used on automobiles. As is well known to those skilled in the art, disk wheels are now quite commonly used.

It is an object of this invention, therefore, to provide a wheel comprising two parts or disks, having outer portions co-operating to form the rim of a wheel and having flanges at their inner portions adapted to surround and be connected to a hub, said disks or parts having a separable connection adjacent their outer portion.

It is a further object of the invention to provide a wheel comprising a pair of disks having portions at their outer edges co-operating to form the rim of a wheel and being joined adjacent their outer edges by a separable fastening which may be connected by successive rectilinear and circumferential movements, said disks being offset axially from the central plane of said wheel and having flanges at their inner edges adapted to be connected to the circular flange of the hub.

It is still another object of the invention to provide a wheel comprising two separable disks having means at their outer edges co-operating to form the rim and being offset axially of the central plane of the wheel whereby a pair of said wheels may be placed in reversed positions and have the inner portions of the disks thereof secured to the circumferential flange of a single hub.

These and other objects and advantages of the invention will be fully set forth in the following description made in connection with the accompanying drawings, in which like reference characters refer to similar parts throughout the several views and in which:—

Fig. 1 is a view in central vertical section of a wheel, showing another wheel connected thereto in dotted lines;

Fig. 2 is a partial side view of the wheel;

Fig. 3 is a radial section taken on line 3—3 of Fig. 2 as indicated by the arrows; and Fig. 4 is a horizontal section taken on line 4—4 of Fig. 2 as indicated by the arrows.

Referring to the drawings, a wheel is shown comprising a disk 5 of flaring or conical shape having a central opening and a flange $5^a$ adjacent said opening disposed in a plane substantially at right angles to the axis of said disk. The disk 5 also has a portion $5^b$ adjacent its outer edge also disposed in a plane at right angles to its axis and said disk further has an outer outwardly flaring edge $5^e$. The disk 5 preferably is formed with an inwardly extending cylindrical portion $5^c$ which is connected as by welding to the cylindrical portion $6^a$ of a member 6 so that members 5 and 6 form one integral piece or unit. The member 6 has at the edge of flange $6^a$, opposite the disk 5, an inwardly extending flange $6^c$ disposed in a plane at right angles to the axis of said member. Another disk 7 is provided having a central opening substantially the same size as the central opening through the disk 5 and has a flange $7^a$ at its inner edge disposed in a plane substantially at right angles to its axis, said disk 7 extending in conical formation from the flange $7^a$ to an outer flange $7^b$ also disposed in a plane substantially at right angles to its axis, the outer edge of which is curved or flared outwardly and adapted to form, as shown in Fig. 1, one side of the rim of a wheel corresponding to the flange $5^e$ at the other side of said rim. The member 7 and the member formed by the members 5 and 6 are adapted to be connected for ready separation or detachment and while various detachable means might be used, in the embodiment of the invention illustrated, the flange $6^c$ has secured thereto a plurality of circumferentially spaced members 8. These members have a shank portion $8^a$ with a reduced rivet portion $8^b$ extending through the flange $6^c$ and riveted thereon by the heads $8^c$. The members 8 at the other end of the shank portion $8^b$ have the head members $8^d$ formed thereon which are thus spaced the length of the shank portion $8^a$ from the flange $6^c$. The flange $7^b$ of the member 7 has a plurality of circumferentially spaced slots formed therein having their center line co-inciding with the center line of the members 8. These said slots include an enlarged substantially circular portion $7^c$ and a smaller circumferentially extending portion $7^d$ communicating therewith. The portions $7^c$ are of such size that the heads $8^d$ of the members 8 will pass therethrough and the width of the portion $7^d$ is such that the heads $8^d$ cannot pass therethrough, but said portions $7^d$ will receive the shanks $8^a$ of the members 8.

A hub member 9 for the wheel is provided which has the usual opening therethrough and is provided with a circumferential flange $9^a$ adjacent one end. The flange $7^a$ engages one side of the flange 9ª and the flange 5ª overlies the flange 7ª. All of said flanges are connected together by a plurality of circumferentially spaced bolts 10 passing through the flanges 5ª and 7ª and threaded into the flange 9ª. It will be noted that the members 5 and 7 are thus, owing to their conical shapes, offset axially a considerable distance to one side of the central plane of the wheel and in the embodiment of the invention illustrated are offset substantially into the plane of one side of the wheel. The wheel is shown as carrying thereon a tire 11 of usual construction comprising an outer casing and an inner tube 11ª. The valve stem 12 for the tube 11ª is illustrated as extending at right angles to the plane of the wheel and passing through a slot 6ᵈ at the outer side of the flange 6ᶜ. The stem also passes through an elongated circumferentially extending slot 7ᵉ formed in the flange 7ᵇ of the member 7, said valve stem being illustrated as equipped with the usual cap 13. A hole 5ᵈ is also formed in disk 5 through which stem 12 may extend.

In operation when the parts are assembled for use, they will occupy the position shown in Figs. 1 and 2. The shanks 8ª of members 8 pass through the portions 7ᵈ of the slots in the member 7 and the heads 8ᵈ are disposed at the outer side of the member 7. The members 6 and 7 and specifically the flanges 7ᵇ and 6ᶜ thereof are therefore locked together and cannot be separated by axial movement. The disks 5 and 7 are also connected to the hub 9 so that the wheel is securely held in assembled position with the tire 11 held on the rim thereof. When it is desired to remove the tire, the bolts 10 will be removed and the members 6 and 7 will be relatively rotated so that the heads 8ᵈ aline with the parts 7ᶜ of the slots in member 7. The member 7 and the member formed by the connected members 5 and 6 can now be separated by axial movement. The tire 11 can thus be readily slid off of the flange 6ª and can be readily replaced thereon or another tire substituted. When the parts are to be reassembled, the members 7 will be moved axially toward the member formed by parts 5 and 6. The heads 8ᵈ will be moved through the portion 7ᶜ of the slots in member 7 and the two members will then be relatively rotated so that the head 8ᵈ move out of alinement with the portion 7ᶜ and the shanks 8ª move into the slot portion 7ᵈ. The two parts are thus again locked together and the bolt holes in the flanges 5ª, 7ª and 9ª brought into alinement. The bolts 10 can now again be placed in position and the wheel is thus again assembled for use with the tire 11 firmly held thereon. It will be seen that the slots 6ᵈ and 7ᵉ accommodate the valve stem 12 during the assembling and disassembling movements.

On account of the fact that the members 5 and 7 are offset axially of the wheel, it will be seen that a pair of wheels may be placed side by side in reversed positions and the flanges 5ª and 7ª of the two wheels brought into contact as shown in dotted lines in Fig. 1. The flanges 5ª and 7ª of both wheels can then be secured to a single hub by the bolts 10, also as illustrated in Fig. 1. A double wheel is thus formed, which wheels are now commonly used on busses and other heavy duty vehicles.

From the above description it is seen that applicant has provided a very simple and efficient construction of a double disk wheel and one by means of which the parts of the wheel can quickly and easily be disassembled or assembled for removal and replacement of the tire. The parts of the device are few and the wheel as made is quite rugged and durable in construction. The structure as described readily lends itself to a double wheel construction.

It will, of course, be understood that various changes may be made in the form, details, arrangement and proportions of the parts, without departing from the scope of applicant's invention, which generally stated, consists in a device capable of carrying out the objects above set forth, in the novel parts and combinations of parts disclosed and defined in the appended claims.

What is claimed is:—

1. A wheel structure having in combination, a pair of disks, one having flanges at its periphery forming respectively the face and one side of the rim and the other having a flange at its periphery forming the other side of said rim, said disks having central conical portions extending axially of said wheel in the same direction and having inner flanges disposed in planes substantially at right angles to the axis of said disks, a hub member extending through said disks and having a circumferential flange adjacent said inner flanges and a plurality of circumferentially spaced bolts passing through said inner flanges and threaded into said flange of said hub.

2. A wheel structure having in combination, two wheels placed side by side, each comprising a pair of disks having central flanges offset axially from the plane of the wheel, said wheels being disposed in reverse positions, whereby said central flanges are in contact, a hub extending through both pairs of disks and having a circumferential flange adjacent one of said central flanges and a plurality of circumferentially spaced bolts passing through the disks of both wheels and threaded into said flange of said hub.

3. A wheel structure comprising two members each forming a side of a wheel, and having outer portions adapted to register to form the rim of a wheel, said members having attaching means at their outer portions adapted to be connected by successive axial and rotative movements, a hub for said wheel having a circumferential flange extending therefrom and a plurality of circumferentially spaced securing means extending through both of these members and securing the same to said flange on said hub.

4. A wheel structure comprising two disk members, said members having their outer portions constructed and arranged to register to form the rim of a wheel, said disks respectively having portions thereon adjacent their outer edges to interengage and lock by relative rotative movement, a hub for said wheel having an integral circumferential flange extending thereabout adjacent one end and said disks having flanges disposed at one side of said flange on said hub and a plurality of circumferentially spaced bolts connecting said flanges on said disks to said flange on said hub.

In testimony whereof I affix my signature.

HALBERT E. THOMPSON.